US010728444B2

United States Patent
Shanmugam et al.

(10) Patent No.: US 10,728,444 B2
(45) Date of Patent: Jul. 28, 2020

(54) AUTOMATED IMAGE CAPTURE SYSTEM WITH EXPERT GUIDANCE

(71) Applicant: International Business Machines Corporation, Armonk, NY (US)

(72) Inventors: Dhandapani Shanmugam, Bangalore (IN); Rahul Chenny, Bangalore (IN); Siddique M. Adoni, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/118,758

(22) Filed: Aug. 31, 2018

(65) Prior Publication Data
US 2020/0077016 A1  Mar. 5, 2020

(51) Int. Cl.
*H04N 5/225* (2006.01)
*H04N 5/232* (2006.01)

(52) U.S. Cl.
CPC ..... *H04N 5/23222* (2013.01); *H04N 5/23206* (2013.01); *H04N 5/23216* (2013.01); *H04N 5/23219* (2013.01); *H04N 5/232933* (2018.08)

(58) Field of Classification Search
CPC combination set(s) only.
See application file for complete search history.

(56) References Cited

U.S. PATENT DOCUMENTS

| 8,169,484 | B2 | 5/2012 | Silberstein |
| 10,129,461 | B2* | 11/2018 | Adoni .................... G06K 9/46 |
| 2013/0058561 | A1 | 3/2013 | Cheng |
| 2013/0107069 | A1 | 5/2013 | Arrasvuori |
| 2013/0342713 | A1* | 12/2013 | Cui ................... H04N 5/23222 348/207.11 |
| 2014/0354768 | A1 | 12/2014 | Mei et al. |
| 2015/0189171 | A1 | 7/2015 | Yim et al. |
| 2018/0039854 | A1* | 2/2018 | Wren ................ G06F 3/04842 |
| 2018/0160036 | A1* | 6/2018 | Chenny .................. G06K 9/46 |

* cited by examiner

*Primary Examiner* — Gary C Vieaux
(74) *Attorney, Agent, or Firm* — Yee & Associates, P.C.

(57) ABSTRACT

A method, apparatus, system, and computer program product for configuring an image capture device. A target activity context for a target object in an image is received by a computer system from the image capture device. A set of photographers for the target object is identified using target activity context. The set of photographers identified is sent to the image capture device. Responsive to receiving a selection of a photographer from the set of photographers from the image capture device, an inbound activity context for the photographer for the target object is sent to the image capture device, wherein the image capture device is configured to capture the image of the target object using the inbound activity context.

20 Claims, 13 Drawing Sheets

TARGET OBJECT: BIRD

| 1102 PRIORITIZED ATTRIBUTE | 1104 STATE | 1106 ATTRIBUTE OCCURENCE | 1108 TOTAL PHOTOGRAPHS | 1110 ATTRIBUTE IMPORTANCE | 1112 PRIORITY LEVEL |
|---|---|---|---|---|---|
| WATER ← 1114 | PRESENT | 5 | 5 | 1 | HIGH |
| BEAK ← 1116 | CLOSED | 3 | 5 | 0.6 | MEDIUM |

AUTOMATED IMAGE CAPTURE SYSTEM WITH EXPERT GUIDANCE

BACKGROUND

1. Field

The disclosure relates generally to imaging systems and, more specifically, to a method, apparatus, system, and computer program product for capturing an image with expert assistance.

2. Description of the Related Art

A camera is an optical device for recording or capturing images. These images may be individual still images or may be a sequence of images that form a video. Digital cameras capture images in a digital memory. The digital cameras may be standalone devices or may be incorporated into other platforms such as a mobile phone, a laptop computer, or a vehicle.

In photography, photographers often have personalized ideas of what is a good photograph. A photographer often has preferences for attributes of a target object and how an image of the target object is captured to form a photograph. The target object may be, for example, a bird, a dog, a car, a building, a statute, a tree, or some other object of interest.

With a bird as a target object, preferences for attributes of the bird can include, for example, front or side orientation, a state of the eyes, the state of the wings, and the state of the legs. The state of eyes can be open or closed; the state of the wings can be spread or folded; and the state of the legs can be standing on one or both. These preferences, however, can be limiting on an ability of a photographer to develop variations on how the photographer captures an image of the bird.

Changing how the photographer captures the image of the target object can be a difficult and time-consuming process. For example, the photographer can view images of the target object captured by other photographers in an attempt to re-create a desired image through trial and error. The photographer can invest an inordinate amount of time in experimenting or studying photographs captured by the other photographers to identify a desired style for the target object and then to re-create the style. This process can be frustrating to the photographer. If the photographer has an interest in a large number of objects, this problem becomes compounded.

Therefore, it would be desirable to have a method and apparatus that take into account at least some of the issues discussed above, as well as other possible issues. For example, it would be desirable to have a method and apparatus that overcome a technical problem with the time and effort in learning to capture images of a target object with a style of another photographer.

SUMMARY

According to one embodiment of the present invention, a method configures an image capture device. A target activity context for a target object in an image is received by a computer system from the image capture device. A set of photographers for the target object is identified using target activity context. The set of photographers identified is sent to the image capture device. Responsive to receiving a selection of a photographer from the set of photographers from the image capture device, an inbound activity context for the photographer for the target object is sent to the image capture device, wherein the image capture device is configured to capture the image of the target object using the inbound activity context.

According to another embodiment of the present invention, an image capture system comprises a computer system. The computer system is configured to receive a target activity context for a target object in an image from an image capture device. The computer system identifies a set of photographers for the target object using target activity context and sends the set of photographers identified to the image capture device. The computer system sends an inbound activity context for a photographer for the target object from the set of photographers to the image capture device in response to receiving a selection of the photographer from the set of photographers from the image capture device, wherein the image capture device is configured to capture the image of the target object using the inbound activity context.

According to yet another embodiment of the present invention, a computer program product for configuring an image capture device comprises a computer-readable-storage media, first program code, second program code, third program code, and fourth program code stored on the computer-readable storage media. The first program code is run to receive a target activity context for a target object in an image from an image capture device. The second program code is run to identify a set of photographers for the target object using target activity context. The third program code is run to send the set of photographers identified to the image capture device. The fourth program code is run to send an inbound activity context for a photographer in the set of photographers for the target object to the image capture device in response to receiving a selection of a photographer from the set of photographers from the image capture device, wherein the image capture device is configured to capture the image of the target object using the inbound activity context.

BRIEF DESCRIPTION OF THE DRAWINGS

FIG. 11 is a table of prioritized attributes in accordance with an illustrative embodiment.

DETAILED DESCRIPTION

Figure 1:
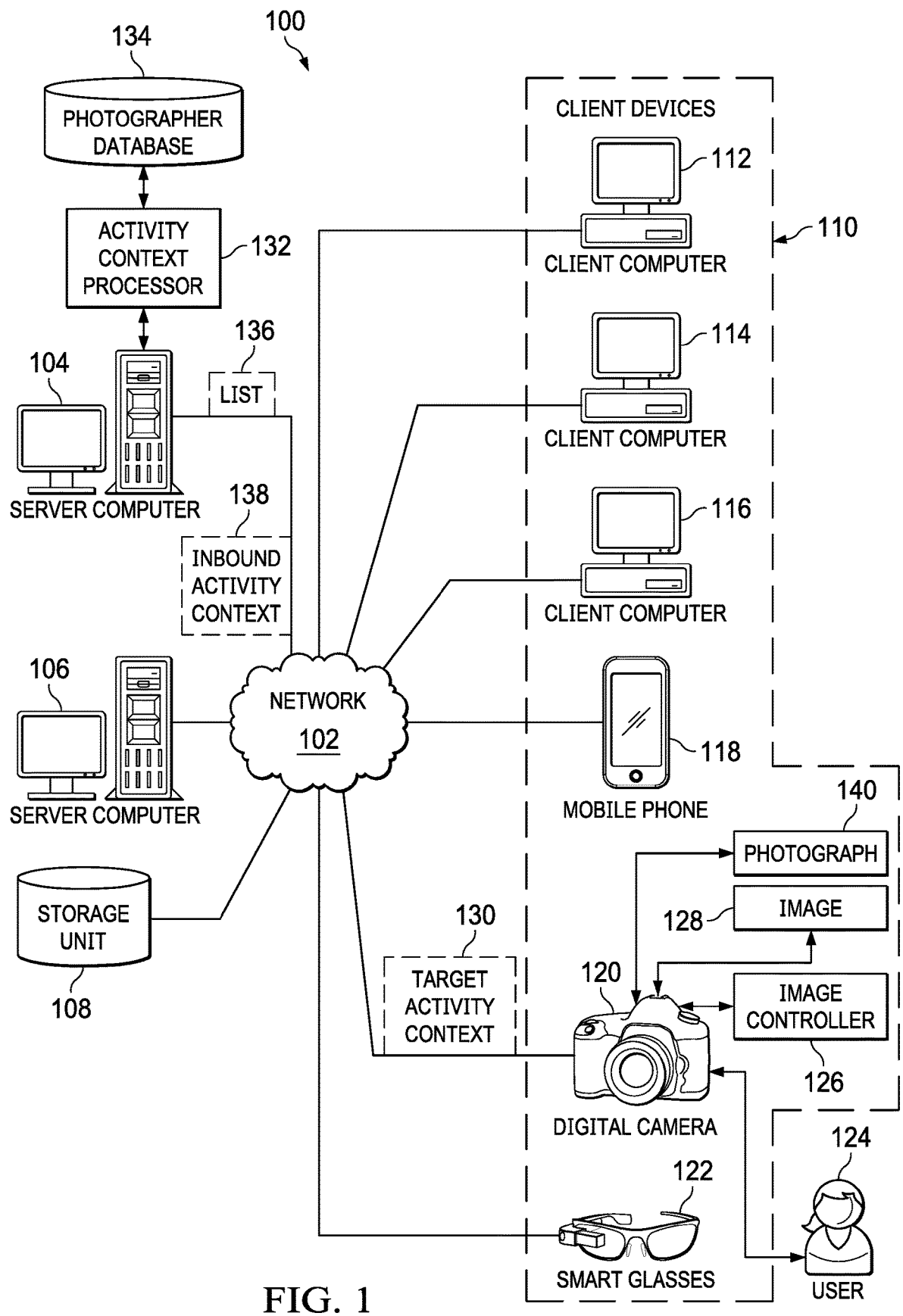
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide a method, apparatus, system, and computer program product for capturing images using an image capture device. In one illustrative example, a method configures the image capture device. A target activity context for a target object in an image is received by a computer system from the image capture device. A set of photographers for the target object is identified using target activity context. The set of photographers identified is sent to the image capture device. Responsive to receiving a selection of a photographer from the set of photographers from the image capture device, an inbound activity context for the photographer for the target object is sent to the image capture device, wherein the image capture device is configured to capture the image of the target object using the inbound activity context.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, digital camera 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer-recordable storage medium and downloaded to a data processing system or other device for use. For example, the program code may be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As depicted, mobile phone 118, digital camera 120, and smart glasses 122 are examples of image capture devices that are configured to capture images for photographs. The image capture devices have connectivity to network 102. As depicted, these devices can connect to network 102 using wireless connections.

In this example, user 124 operates digital camera 120 to capture images for photographs of different target objects. For example, user 124 can capture images of a target object such as a bird. In this illustrative example, image controller 126 in digital camera 120 takes the form of hardware, software, or some combination thereof. As depicted, image controller 126 identifies the target object from image 128.

In this example, image 128 can be analyzed by image controller 126 to identify the target object in image 128. The identification of the target image and other information from target activity context 130. The other information can include at least one of an identification of user 124, an identification of digital camera 120, information about how image 128 was formed, information about objects around the target object in image 128, or other suitable information.

In this illustrative example, image controller 126 in digital camera 120 sends target activity context 130 to activity context processor 132 in server computer 104. Activity context processor 132 identifies a set of photographers in photographer database 134 using target activity context 130 received from digital camera 120. As depicted, the set of photographers in photographer database 134 are skilled or expert photographers for one or more types of target objects. Photographer database 134 can include photographers for target objects of any level of expertise in other illustrative examples.

Activity context processor 132 identifies the set of photographers in photographer database 134 having activity contexts for the target object that matches target activity context 130 or are within some threshold or level of acceptability. Activity context processor 132 sends list 136 of the photographers identified to image controller 126 in digital camera 120.

In this illustrative example, image controller 126 displays list 136 of photographers to user 124. When user 124 selects a photographer from list 136, the selection is sent to activity context processor 132. Activity context processor 132 sends inbound activity context 138 for the selected photographer to image controller 126 in digital camera 120.

In this example, inbound activity context 138 can include photographic settings for digital camera 120 as well as other information describing the context for capturing an image. The photographic settings can be, for example, at least one of exposure time, aperture, focus, depth of field, flash, International Organization for Standardization (ISO) speed, or other camera settings.

As depicted, image controller 126 in digital camera 120 compares target activity context 130 with inbound activity context 138 to form a comparison. When a sufficient match is present in the comparison, image controller 126 performs an action. The action can be, for example, displaying a visual indicator, making an audible indication, capturing image 128, or some combination thereof to form photograph 140.

A sufficient match can be an exact match or a match between some portion of target activity context 130 and inbound activity context 138. For example, if inbound activity context 138 includes water being present and a beak of a bird being in a closed state and target activity context 130 includes water being present but the beak of the bird is in an open state, the match may be considered sufficiently close.

Further, in this illustrative example, the comparison between target activity context 130 and inbound activity context 138 can be performed continuously, periodically, or in response to an event. As depicted, image 128 can change over time. For example, image 128 can change if user 124 moves digital camera 120, the target object or other items in image 128 change, or both user 124 moves digital camera 120 and the target object or the other items in image 128 change. Thus, as image 128 changes, target activity context 130 also can change.

Figure 2:
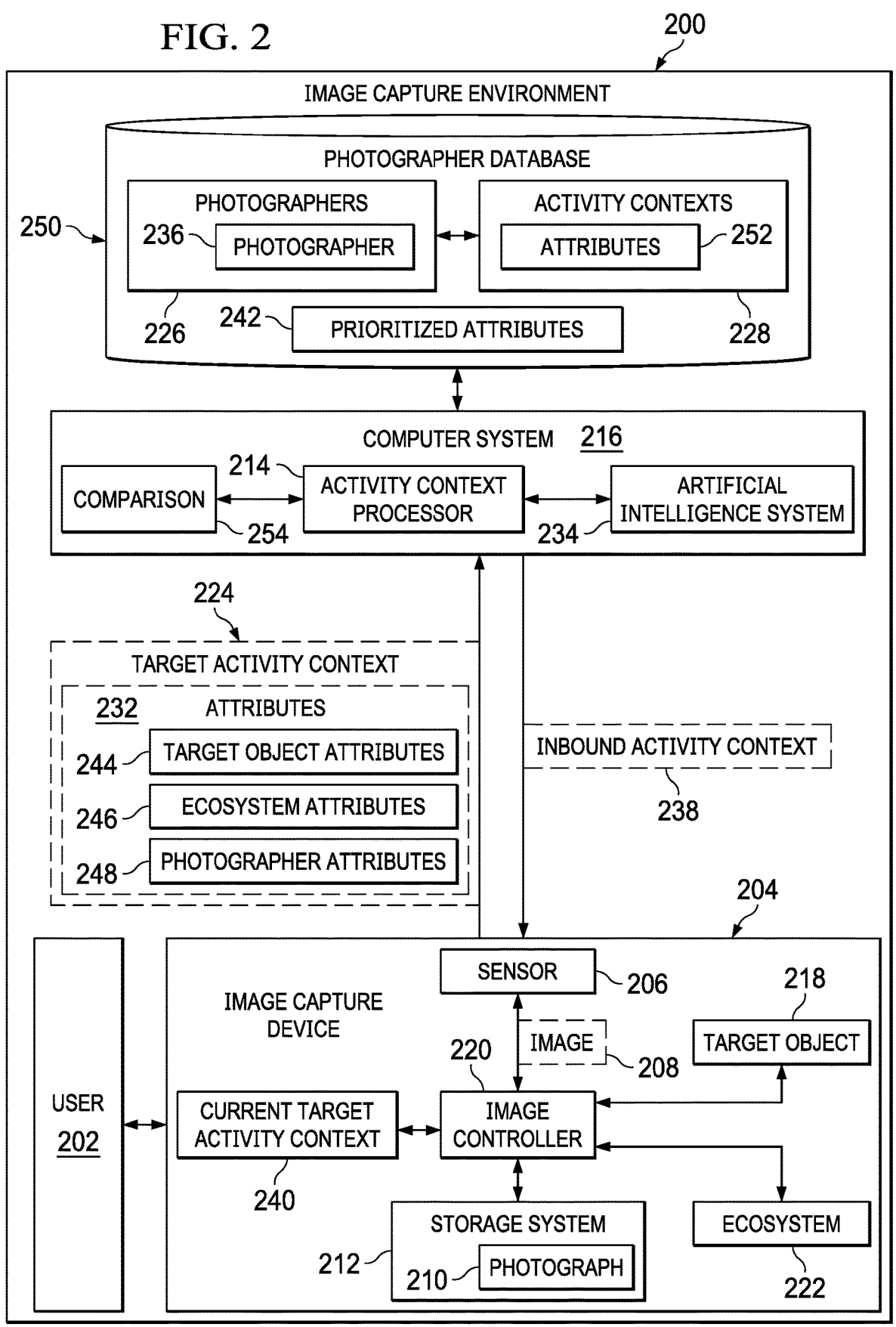
FIG. 2 is a block diagram of an image capture environment in accordance with an illustrative embodiment.

With reference now to FIG. 2, a block diagram of an image capture environment is depicted in accordance with an illustrative embodiment. In this illustrative example, image capture environment 200 includes components that can be implemented in hardware such as the hardware shown in network data processing system 100 in FIG. 1.

As depicted, user 202 operates image capture device 204 in image capture environment 200. Sensor 206 in image capture device 204 can detect light from an environment to form image 208. In the illustrative example, sensor 206 can be, for example, a semiconductor charge-coupled device (CCD), an active pixel sensor, or some other suitable type of sensor.

User 202 can operate image capture device 204 to capture image 208 to form photograph 210. In this depicted example, capturing image 208 involves saving image 208 in storage system 212. Storage system 212 is a hardware system and includes a number of storage devices. Storage system 212 can include at least one of a built-in memory, a solid-state drive, a flash drive, a memory card, or some other suitable type of memory device that can store photographs.

As depicted, image capture device 204 may take a number of different forms. For example, image capture device 204 can be selected from a group comprising a digital camera, a mobile phone, a smart phone, a personal digital assistant, a table computer, a laptop computer, or some other suitable device that can capture images.

In this illustrative example, activity context processor 214 runs on computer system 216. Computer system 216 is a physical hardware system and includes one or more data processing systems. When more than one data processing system is present in computer system 216, those data processing systems are in communication with each other using a communications medium. The communications medium may be a network. The data processing systems may be selected from at least one of a computer, a server computer, a work station, a tablet computer, or some other suitable data processing system. Image capture device 204 and activity context processor 214 in computer system 216 communicate with each other over a network, such as network 102 in FIG. 1.

As depicted, user 202 can point or position image capture device 204 at target object 218, resulting in image 208. Image controller 220 in image capture device 204 can identify target object 218 from image 208. The identification can be made by image controller 220 using object recognition techniques, user input from user 202, or some combination thereof.

Further, image controller 220 can also identify ecosystem 222 from image 208. Ecosystem 222 includes information about objects other than target object 218. For example, ecosystem 222 can include background objects, which are non-target objects. Ecosystem 222 can also include other features about image 208 such as a time, a light level, a location, or other information about image 208.

In this illustrative example, image controller 220 generates target activity context 224 for image 208 using information about image 208 such as target object 218 and ecosystem 222. Target activity context 224 can also include other information such as an identification of user 202, image capture device 204, preferences for user 202, settings for image capture device 204, or other suitable information. This information can be described using attributes 232.

In the illustrative example, the set of attributes 232 for target object 218 can be referred to as a set of target object attributes 244. The set of target object attributes 244 is selected from at least one of a target object type, a category of the target object, a focus point of interest in the target object, a size of the target object, a distance between the target object and an image capture device, an angle between the target object and the image capture device, a view type of the target object, a shadow indicator, or some other information about target object 218 in image 208.

The set of attributes 232 for ecosystem 222 are referred to as a set of ecosystem attributes 246. This set of ecosystem attributes 246 can be selected from at least one of a time, a light level, a location, an ecosystem object type, or other information about ecosystem 222.

The set of attributes 232 can also include attributes for user 202 in the form of a set of photographer attributes 248. In this illustrative example, the set of photographer attributes 248 can include at least one of a user identification for user 202, information about image capture device 204, or other suitable information relating to user 202.

As depicted, image controller 220 in image capture device 204 sends target activity context 224 to activity context processor 214 in computer system 216. In response to receiving target activity context 224 for target object 218 in image 208 from image capture device 204, activity context processor 214 identifies a set of photographers 226 for target object 218 in photographer database 250 using target activity context 224. Photographer database 250 comprises activity contexts 228 and photographers 226 associated with activity contexts 228.

In the illustrative example, activity context processor 214 identifies the set of photographers 226 using target activity context 224 and activity contexts 228 associated with the set of photographers 226 in photographer database 250. Activity context processor 214 can use target activity context 224 to search activity contexts 228 associated with photographers 226 in photographer database 250.

For example, activity context processor 214 identifies a set of prioritized attributes 242 from prioritized attributes 242 using attributes 232 in target activity context 224. The set of prioritized attributes 242 are used to search for the set of photographers 226.

In this illustrative example, prioritized attributes 242 are attributes associated with user 202 that have been prioritized, ranked, categorized, or given a value that indicates importance relative to one or more other attributes in attributes 232. Prioritized attributes 242 can be for target object 218. Additionally, prioritized attributes 242 can be other target objects for which user 202 has captured images of the other target objects previously. In this example, prioritized attributes 242 are stored in photographer database 250, but can be stored in other locations such as image capture device 204, a network attached storage device, or some other location. When prioritized attributes 242 are stored in image capture device 204, image controller 220 can include a set of prioritized attributes 242 for target object 218 as part of attributes 232 in target activity context 224.

Activity context processor 214 searches for the set of prioritized attributes 242 for target object 218 in prioritized attributes 242 based on a target object attribute that identifies target object 218. In one illustrative example, target activity context 224 includes a set of photographer attributes 248 in the form of an identification of user 202 and a set of target object attributes 244 in the form of an identification of the target object type of target object 218. This information can be used identify a set of prioritized attributes 242 for user 202 stored in photographer database 250. If the set of prioritized attributes 242 is not present for target object 218, attributes 232 in target activity context 224 are used as the set of prioritized attributes 242 for target object 218.

Activity context processor 214 compares the set of prioritized attributes 242 with attributes 252 in activity contexts 228 for photographers 226 in photographer database 250 to form comparison 254 which is used to identify the set of photographers 226. Comparison 254 indicates how many of the set of prioritized attributes 242 match attributes 252 for each activity context within activity contexts 228 for target object 218. Photographers 226 can then be ranked based on how many matches are present. The process selects a set of photographers 226 from this comparison.

In other illustrative examples, activity context processor 214 can compare attributes 232 in target activity context 224 with attributes 252 in activity contexts 228 for target object 218 instead of using the set of prioritized attributes 242.

In this illustrative example, activity context processor 214 can compare the set of prioritized attributes 242 for target object 218 with attributes 252 for target object 218 to form comparison 254 in a number of different ways. For example, activity context processor 214 can compare the set of prioritized attributes 242 for target object 218 with attributes 252 for target object 218 to determine whether a prioritized attribute in the set of prioritized attributes 242 is present in attributes 252. As another example, if a prioritized attribute is present in attributes 252, activity context processor 214 can also compare the value for the prioritized attribute with the value of the matching attribute in attributes 252 in determining whether to include a photographer or take that matching value in consideration and ranking photographers 226.

Further, user 202 may include an option that suppresses or ignores all or a selected number of prioritized attributes 242 present for target object 218. For example, if target object 218 is a bird and the set of prioritized attributes 242 includes a beak, wings, and a stance, user 202 can choose to ignore specific values for prioritized attributes such as beak, wings, and stance. In other words, whether the beak is open or closed, the wings are spread or folded, or two feet are on a surface are specific values that can be selectively ignored based on input or preferences for user 202. As another example, user input or preferences for user 202 can perform the search only using the beak a prioritized attribute and open as the value for the beak.

Activity context processor 214 sends the set of photographers 226 identified to image controller 220 in image capture device 204. User 202 can select photographer 236 from the set of photographers 226 at image capture device 204. The selection is sent from image capture device 204 to activity context processor 214. In response to receiving the selection of photographer 236, inbound activity context 238 for photographer 236 is sent to image controller 220 in image capture device 204. Image capture device 204 is configured to capture image 208 for target object 218 using inbound activity context 238. As a result, photograph 210 can have a style of photographer 236.

In this illustrative example, image controller 220 in image capture device 204 compares inbound activity context 238 with current target activity context 240 for target object 218 to form a comparison. Image 208 can be captured by image capture device 204 based on the comparison to form photograph 210.

In the illustrative examples, attributes 232 can be prioritized based on the preferences of user 202 to form prioritized attributes 242. The determination of prioritized attributes 242 can be made through at least one of user input or analyzing attributes 232 present in photographs captured by user 202 to determine prioritized attributes 242 for user 202.

As depicted, activity context processor 214 can include or access artificial intelligence system 234 to identify the set of photographers 226. Further, activity context processor 214 can use artificial intelligence system 234 to learn preferences of user 202 for attributes 232 for target object 218 to update prioritized attributes 242 for target object 218.

Artificial intelligence system 234 is a system that has intelligent behavior and can be based on function of a human brain. An artificial intelligence system comprises at least one of an artificial neural network, a cognitive system, a Bayesian network, fuzzy logic, an expert system, a natural language system, or some other suitable system. Machine learning is used to train a process or artificial intelligence system. Machine learning involves inputting data to the process and allowing the process to adjust and improve the function of the artificial intelligence system.

Activity context processor 214 and image controller 220 can be implemented in software, hardware, firmware, or a combination thereof. When software is used, the operations performed by activity context processor 214 and image controller 220 can be implemented in program code configured to run on hardware, such as a processor unit. When firmware is used, the operations performed by activity context processor 214 and image controller 220 can be implemented in program code and data and stored in a persistent memory to run on a processor unit. When hardware is employed, the hardware may include circuits that operate to perform the operations in activity context processor 214 and image controller 220.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can may be implemented in organic components integrated with inorganic components and may be comprised entirely of organic components excluding a human being. For example, the processes may be implemented as circuits in organic semiconductors.

In one illustrative example, one or more technical solutions are present that overcome a technical problem with an amount of time and effort learning to capture images of target object 218 using a style of another photographer. As a result, one or more technical solutions can provide a technical effect of enabling user 202 to capture images of target objects with different desired styles with a reduced amount of time and effort. One or more technical solutions enable user 202 to capture images with a style similar to or mimicking one or more of photographers 226 by downloading activity contexts 228 for photographers 226. The downloading of activity contexts 228 can be provided as a service to user 202 and may require a fee in some illustrative examples.

One or more technical solutions enable user 202 to capture images of target object 218 with a style for an expert photographer for target object 218. One or more technical solutions enable dynamically configuring image capture device 204 to capture images of target object 218 with a desired style of a selected photographer while image capture device 204 is pointed at target object 218.

As a result, computer system 216 operates as a special purpose computer system in which activity context processor 214 in computer system 216 enables sending activity context to image capture device 204 such that user 202 is able to capture images with an activity context for a selected photographer. In particular, activity context processor 214 transforms computer system 216 into a special purpose computer system as compared to currently available general computer systems that do not have activity context processor 214.

Thus, activity context processor 214 running on computer system 216 operates to configure image capture device 204 to capture images that has a style for an experienced expert photographer. This configuration of image capture device 204 can enable user 202 to capture images having a look and feel of other photographers without having to attempt to re-create this look and feel through at least one of experimenting or performing an in-depth study of works from the other photographers.

The illustration of image capture environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, activity context processor 214 can receive target activity contexts from one or more image capture devices in addition or in place of image capture device 204. As another example, activity contexts 228 for photographers 226 can be downloaded and saved by image capture device 204. In other words, downloaded activity contexts can be saved and used again at a later time without needing to communicate with activity context processor 214.

Further, once user 202 has captured image 208, target activity context 224 for target object 218 can be sent by image controller 220 to activity context processor 214. This target activity context can be used to update the set of prioritized attributes 242 for target object 218. The differences between attributes 232 in target activity context 224 and the set of prioritized attributes 242 for target object 218 can be used to update the set of prioritized attributes 242. In this manner, activity context processor 214 can learn changes in style or preferences of user 202 for capturing images of target object 218.

In yet another example, activity context processor 214 can compare attributes 232 in target activity context 224 directly with attributes 252 for activity contexts 228 in addition to or in place of using a set of prioritized attributes 242 for target object 218. This type of comparison can also be used to identify photographers 226 for capturing image 208 of target object 218.

Figure 3:
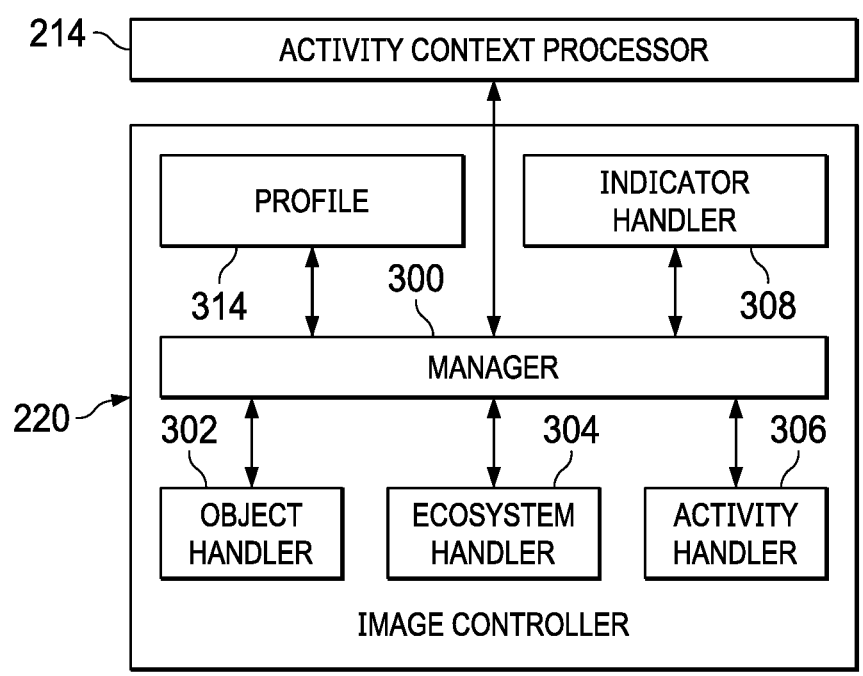
FIG. 3 is a block diagram of an image controller in accordance with an illustrative embodiment.

In FIG. 3, a block diagram of an image controller is depicted in accordance with an illustrative embodiment. In the illustrative examples, the same reference numeral may be used in more than one figure. This reuse of a reference numeral in different figures represents the same element in the different figures In this illustrative example, image controller 220 includes a number of different components. As depicted, image controller 220 comprises manager 300, object handler 302, ecosystem handler 304, activity handler 306, and indicator handler 308.

As depicted, manager 300 controls the processing of images by the different components in image controller 220. This component receives inputs from one or more of object handler 302, ecosystem handler 304, activity handler 306, and indicator handler 308. Manager 300 also controls communicating with activity context processor 214.

As depicted, object handler 302 employs image analysis and searching techniques to identify a target object in an image. Object handler 302 can use existing techniques for image analysis and object identification.

In some illustrative examples, an object can be identified as a target object by user input, a spot focus, auto focus, or other mechanisms. In addition to locating the target object, object handler 302 identifies target object type for the target object. For example, as part of identifying the target object, object handler 302 can identify a target object type such as a dog, a word, a statue, a building, or other object. Further, object handler 302 also identifies attributes for the target object. For example, a bird can have attributes such as a head, a beak, eyes, wings, and a stance. As another example, the bird can also have attributes such as movable. As another example, a statue of a person can have attributes such as a head, eyes, a mouth, arms, and legs. The attributes of the statue can be, for example, immovable, inanimate, and human.

Ecosystem handler 304 is configured to identify information about ecosystem objects which are objects other than the target object in the image. The identification of the ecosystem objects can include identifying ecosystem object types such as a tree, a rock, a stream, or some other ecosystem object type.

Ecosystem handler 304 can also identify attributes for these ecosystem objects. For example, a stream can have attributes of water and moving. As another example, a tree can have attributes of immovable, shadow, and sway motion. Moreover, ecosystem handler 304 can also identify information about the ecosystem such as a time, a light level, a location, or other information.

In this illustrative example, activity handler 306 processes one or more target objects identified and categorized by object handler 302, and processes ecosystem objects and other information identified by ecosystem handler 304 to create a target activity context for the image that manager 300 sends to activity context processor 214.

In this illustrative example, manager 300 can also obtain other information for creating a target activity context. This information can be retrieved from profile 314. Profile 314 for a user can include an identification of the user, an identification of the image capture device, details about the image capture device, and other suitable information. For example, profile 314 also can include preferences of the user for different attributes.

Further, manager 300 can receive a set of photographers from activity context processor 214 for presentation to the user. In response to a selection of a photographer, manager 300 sends the selection to activity context processor 214. With this selection, an inbound activity context is received by manager 300 from activity context processor 214. In this illustrative example, the inbound activity context is compared continuously with the current target activity context by activity handler 306. When a sufficient match is present, an indication is sent to manager 300, which uses indicator handler 308 to present a visual or audio indication that an image can be captured. Additionally, indicator handler 308 can trigger an event to capture the image in addition to or in place of presenting the visual or audio indication.

Figure 4:
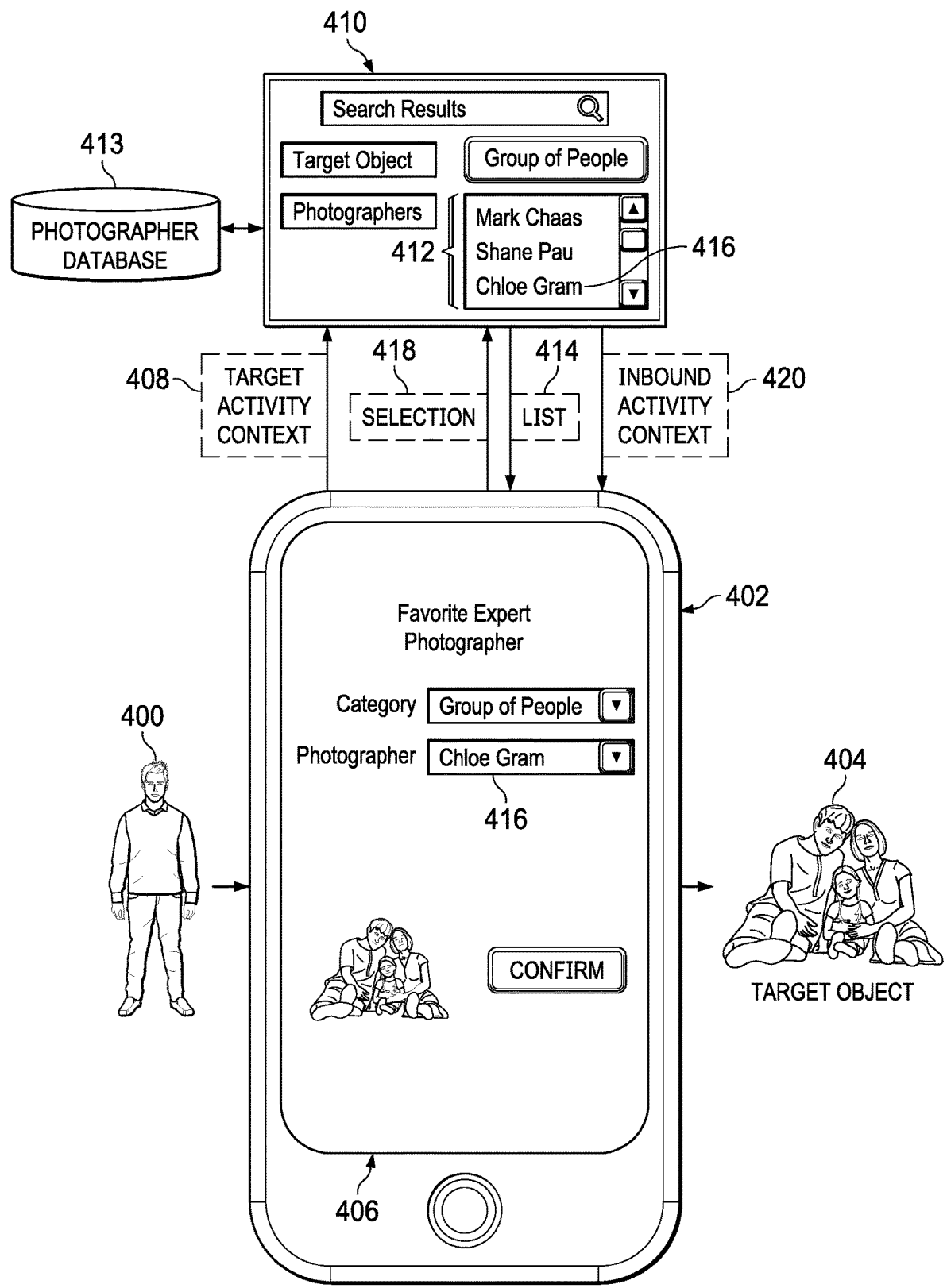
FIG. 4 is a data flow diagram for configuring an image capture device to capture an image of a target object in accordance with an illustrative embodiment.

With reference next to FIG. 4, a data flow diagram for configuring an image capture device to capture an image of a target object is depicted in accordance with an illustrative embodiment. In this illustrative example, user 400 points mobile phone 402 at a group of people 404. Mobile phone 402 is an example of an implementation of image capture device 204 in FIG. 2. The group of people 404 is an example of target object 218 in FIG. 2.

Image controller 406 in mobile phone 402 identifies the group of people 404 as the target object. Image controller 406 is an example of image controller 220 and can be implemented using components depicted in FIG. 3 for image controller 220.

As depicted, image controller 406 creates target activity context 408 and sends target activity context 408 to activity context processor 410, which is an example of activity context processor 214 in FIG. 2. Activity context processor 410 identifies a set of photographers 412 as photographers that have activity contexts for the target object, which is the group of people 404. Activity processor 410 identifies photographers 412 from photographer database 413. As depicted, photographers 412 are photographers that have an expertise in capturing images of the group of people 404.

In this example, activity context processor 410 returns an identification of photographers 412 in list 414 to image controller 406 in mobile phone 402. In this depicted example, user 400 selects photographer 416 from list 414. Selection 418 is sent to activity context processor 410 from image controller 406 in mobile phone 402. In response to receiving selection 418 of photographer 416, activity context processor 410 retrieves the activity context for photographer 416 from photographer database 413 and sends this activity context as inbound activity context 420 to image controller 406 in mobile phone 402. Inbound activity context 420 is used by image controller 406 to configure mobile phone 402 to capture an image of the group of people 404 with a style following photographer 416.

Image controller 406 continuously compares inbound activity context 420 and the current target activity context until a sufficient match is present. When the sufficient match is present, an indication can be made by image controller 406 to user 400 that the image should be captured. Image controller 406 can automatically capture the image in addition to or in place of making the invitation to user 400.

Figure 5:
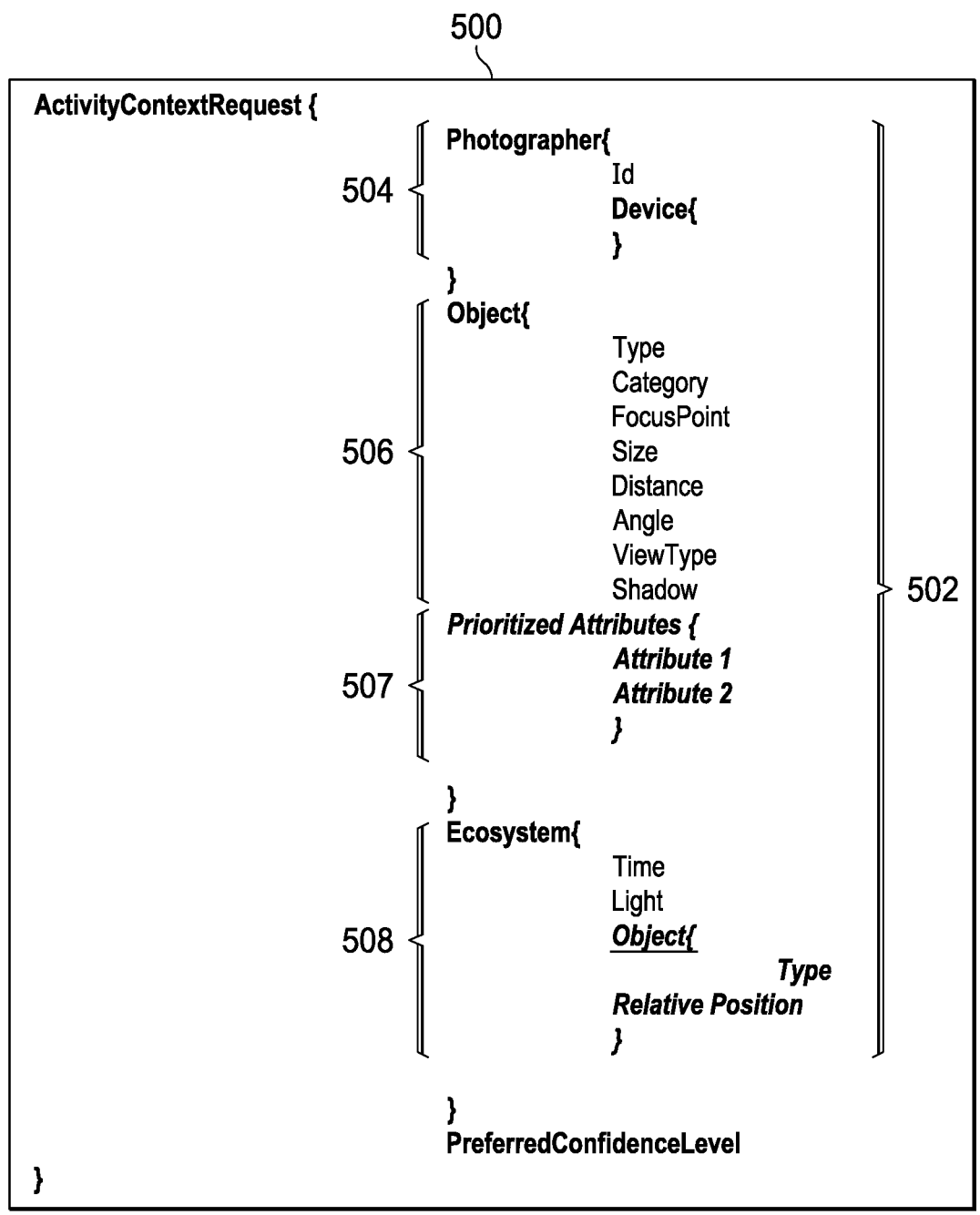
FIG. 5 is a diagram message containing a target activity context in accordance with an illustrative embodiment.

Turning to FIG. 5, a diagram of a target activity context is depicted in accordance with an illustrative embodiment. In this example, target activity context 500 is an example of an implementation of target activity context 224 in FIG. 2.

As depicted in this example, target activity context 500 includes attributes 502 for an image of a target object in an image capture device. In this illustrative example, attributes 502 include photographer attributes 504, target object attributes 506, and ecosystem attributes 508. As depicted, attributes 502 are an example of an implementation for attributes 232 in FIG. 2. In this illustrative example, photographer attributes 504, target object attributes 506, prioritized attributes 507, and ecosystem attributes 508 are examples of photographer attributes 248, target object attributes 244, and ecosystem attributes 246 in FIG. 2.

As depicted, photographer attributes 504 can include at least one of an identification of the user and information about the image capture device. The information about the image capture device can include at least one of a make and model of the image capture device, a resolution, an exposure, an aperture, a digital sensor that generates the image, or other information about the image capture device.

In this illustrative example, target object attributes 506 can include at least one of a target type, a category, a focus point, a size, a distance, an angle, a view type, a shadow, or other suitable types of information about the target object. The target object type indicates what the target object is. For example, the target object type can be a bird, a statute, a tree, a building, or some other type of object. The category indicates whether the target object is movable or immovable. The focus point can specify a focal point of interest in the target object. For example, if the target object is a bird, the focal point can be the beak versus the wing. The size can identify the size of the target object, and the distance can identify the distance between the target object and the user. The angle can identify an angle of incidence between the image capture device and the target object. A view type can specify a view of the target with respect to the image capture device. For example, the view type can be a top view, a side view, a front view, or some other view. The shadow can specify whether a shadow is on the target object in the image.

As depicted, prioritized attributes 507 include target object attributes and also may include ecosystem attributes and photographer attributes. Prioritized attributes 507 identify attributes that are considered important or preferred by a user. Prioritized attributes 507 are specific to a specific user and target object. Prioritized attributes 507 can include photographer attributes 504, target object attributes 506, and ecosystem attributes 508. Prioritized attributes 507 can also include attributes not found in photographer attributes 504, target object attributes 506, and ecosystem attributes 508 in target activity context 500. For example, prioritized attributes 507 may be for a target object that is a bird that includes a beak in an open state and a stream of water. In this depicted example, target object attributes 506 for the image of the target object can include a bird with a beak in an open state, but ecosystem attributes 508 may not include a stream of water. In other words, the image of the bird does not include a stream of water.

Ecosystem attributes 508 can describe aspects in the ecosystem in the image other than the target object. For example, ecosystem attributes 508 may include time and light. The time of day at which the image is taken and the light can indicate the ambient light level in the image. Ecosystem attributes 508 also can include attributes for ecosystem objects, which are objects other than the target object. In this illustrative example, ecosystem attributes 508 include an object type and a relative position for one or more ecosystem objects.

The illustration of target activity context 500 is provided as an example of one implementation for target activity context 224 shown in block form in FIG. 2. This illustration is not meant to limit the manner in which target activity context 224 can be implemented in other illustrative examples. For example, in another illustrative example, prioritized attributes 507 may be omitted. Prioritized attributes 507 can be stored in a remote database such as photographer database 250 in FIG. 2 and identified using a photographer identification attribute identifying the user at photographer attributes 504.

Figure 6:
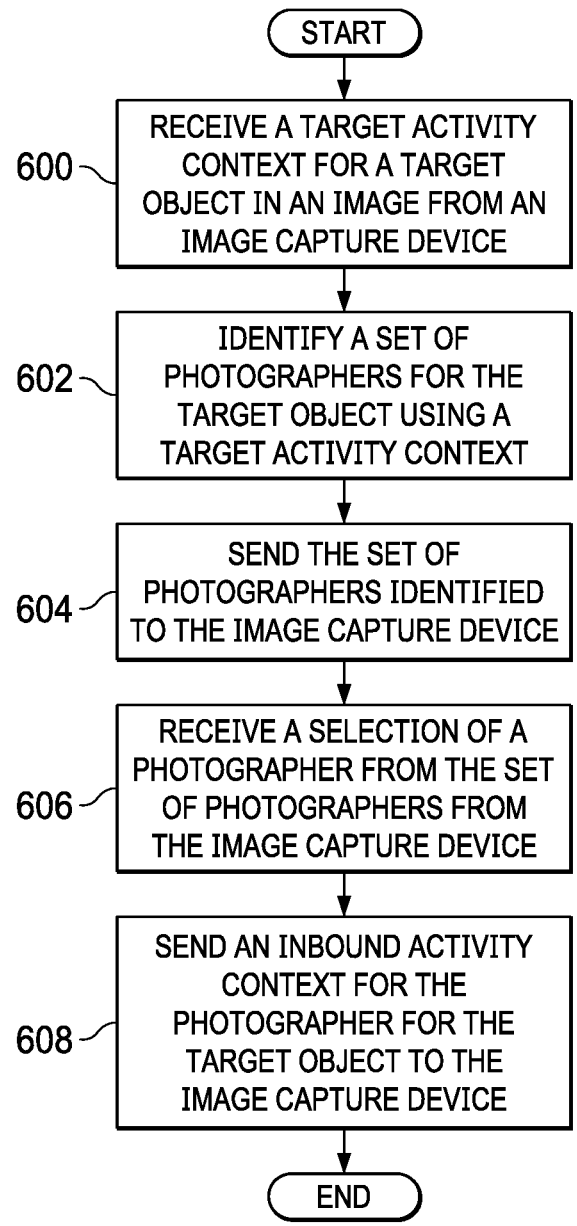
FIG. 6 is a flowchart of a process for configuring an image capture device in accordance with an illustrative embodiment.

Turning next to FIG. 6, a flowchart of a process for configuring an image capture device is depicted in accordance with an illustrative embodiment. The processes in FIG. 6 can be implemented in hardware, software, or both. When implemented in software, the processes can take the form of program code that is run by one of more processor units located in one or more hardware devices in one or more computer systems. For example, these processes can be implemented in activity context processor 214 running on computer system 216 in FIG. 2.

The process begins by receiving a target activity context for a target object in an image from an image capture device (step 600). The process identifies a set of photographers for the target object using a target activity context (step 602). In step 602, the set of photographers can be identified by comparing a set of prioritized attributes for the target object with attributes in activity contexts for the target object associated with photographers. In another illustrative example, the set of photographers can be identified by making a direct comparison between the attributes in the target activity context and the attributes in the activity context for the target object associated with the photographers. When a selection of a photographer is made from the identification, the inbound activity context sent to the image capture device for the selected photographer can include other attributes such as photographer attributes that identify settings in image capture device to capture the image target object. These photographer attributes can include, for example, a focus point, an ISO speed, or some other setting. Additionally, the inbound activity context can also include ecosystem attributes that can be matched as a user moves or adjusts the image capture device to obtain a desired image for the target object. The ecosystem attributes can include, for example, lighting in the image.

The process sends the set of photographers identified to the image capture device (step 604). The process receives a selection of a photographer from the set of photographers from the image capture device (step 606).

Responsive to receiving the selection of the photographer from the set of photographers from the image capture device, the process sends an inbound activity context for the photographer for the target object to the image capture device (step 608). The process terminates thereafter. With this process, the image capture device can be configured to capture the image of the target object using the inbound activity context.

Figure 7:
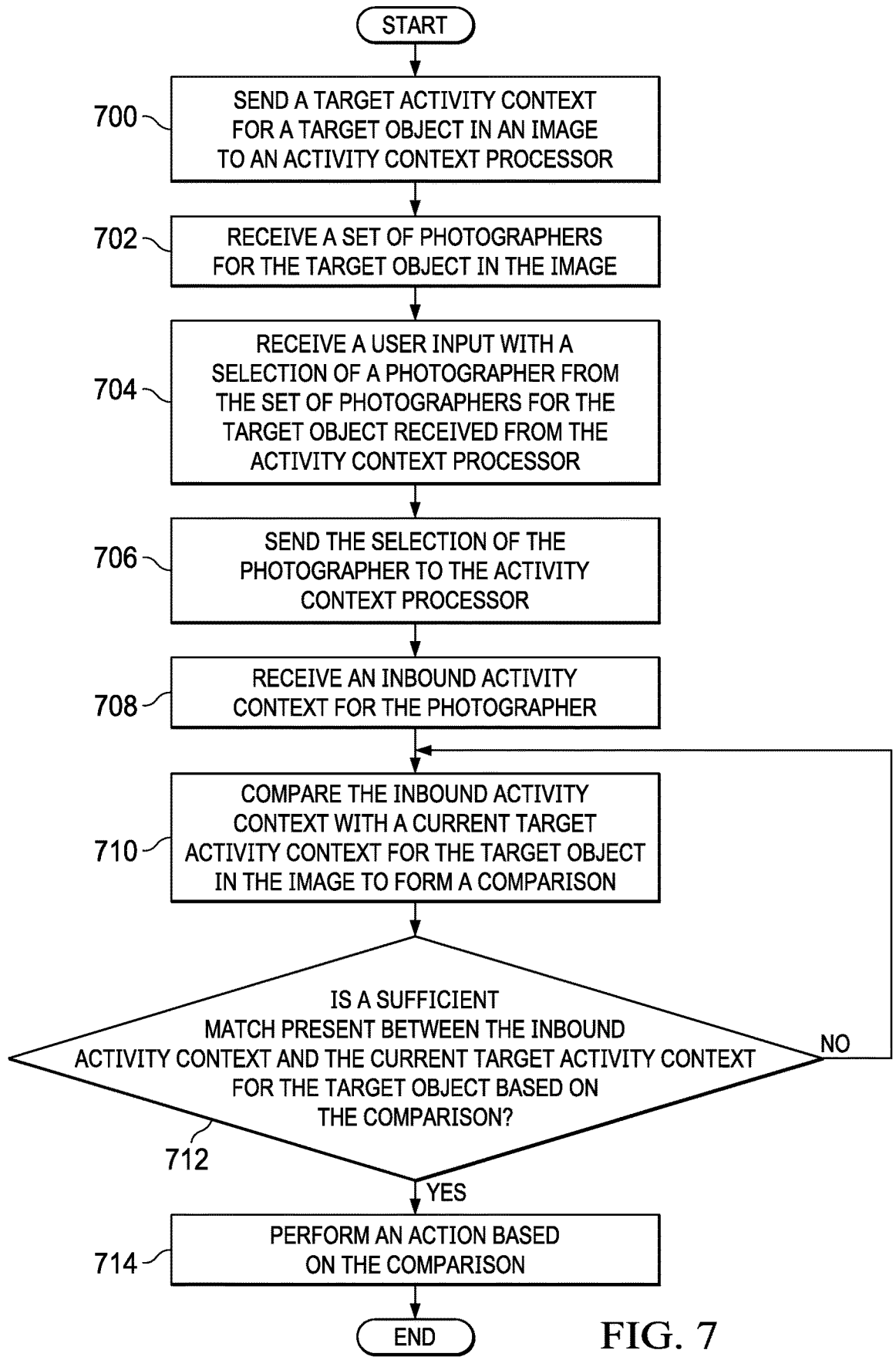
FIG. 7 is a flowchart of a process for capturing an image with an image capture device in accordance with an illustrative embodiment.

With reference next to FIG. 7, a flowchart of a process for capturing an image with an image capture device is depicted in accordance with an illustrative embodiment. The processes in FIG. 7 can be implemented in hardware, software, or both. When implemented in software, the processes can take the form of program code that is run by one of more processor units located in one or more hardware devices in one or more computer systems. For example, these processes can be implemented in image controller 220 in image capture device 204 in FIG. 2.

The process beings by sending a target activity context for a target object in an image to an activity context processor (step 700). The process receives a set of photographers for the target object in the image (step 702). The process receives a user input with a selection of a photographer from the set of photographers for the target object received from the activity context processor (step 704). The process sends the selection of the photographer to the activity context processor (step 706).

Responsive to sending the selection of the photographer, the process receives an inbound activity context for the photographer (step 708). The process compares the inbound activity context with a current target activity context for the target object in the image to form a comparison (step 710). A determination is made as to whether a sufficient match is present between the inbound activity context and the current target activity context for the target object based on the comparison (step 712). Whether a sufficient match is present can be based on prioritized attributes and their priority levels. For example, if the priority levels for the prioritized attributes are high, medium, and low, a sufficient match can be present if all of the prioritized attributes with high and medium levels in a current target activity context match the inbound activity context. In another example, a sufficient match can be present if all of the prioritized attributes in the current target activity context match the inbound activity context. The threshold for a sufficient match can be set by the user or have a default setting.

If a sufficient match is absent, the process returns to step 710. The comparison in step 710 is performed continuously in this example until a sufficient match is present. As depicted, the current target activity context can change as the user changes the position of the image capture device, the target object or other objects move, or both the user changes the position of the image capture device and the target object or other objects move. As a result, the comparison can change.

With reference again to step 712, if a sufficient match is present, the process performs an action based on the comparison (step 714). The process terminates thereafter. The action in step 714 can take a number of different forms. For example, the action can be indicating that the image can be captured using an audio indication or a visual indication. In another example, the action can be automatically capturing the image to form the photograph of the target object.

Figure 8:
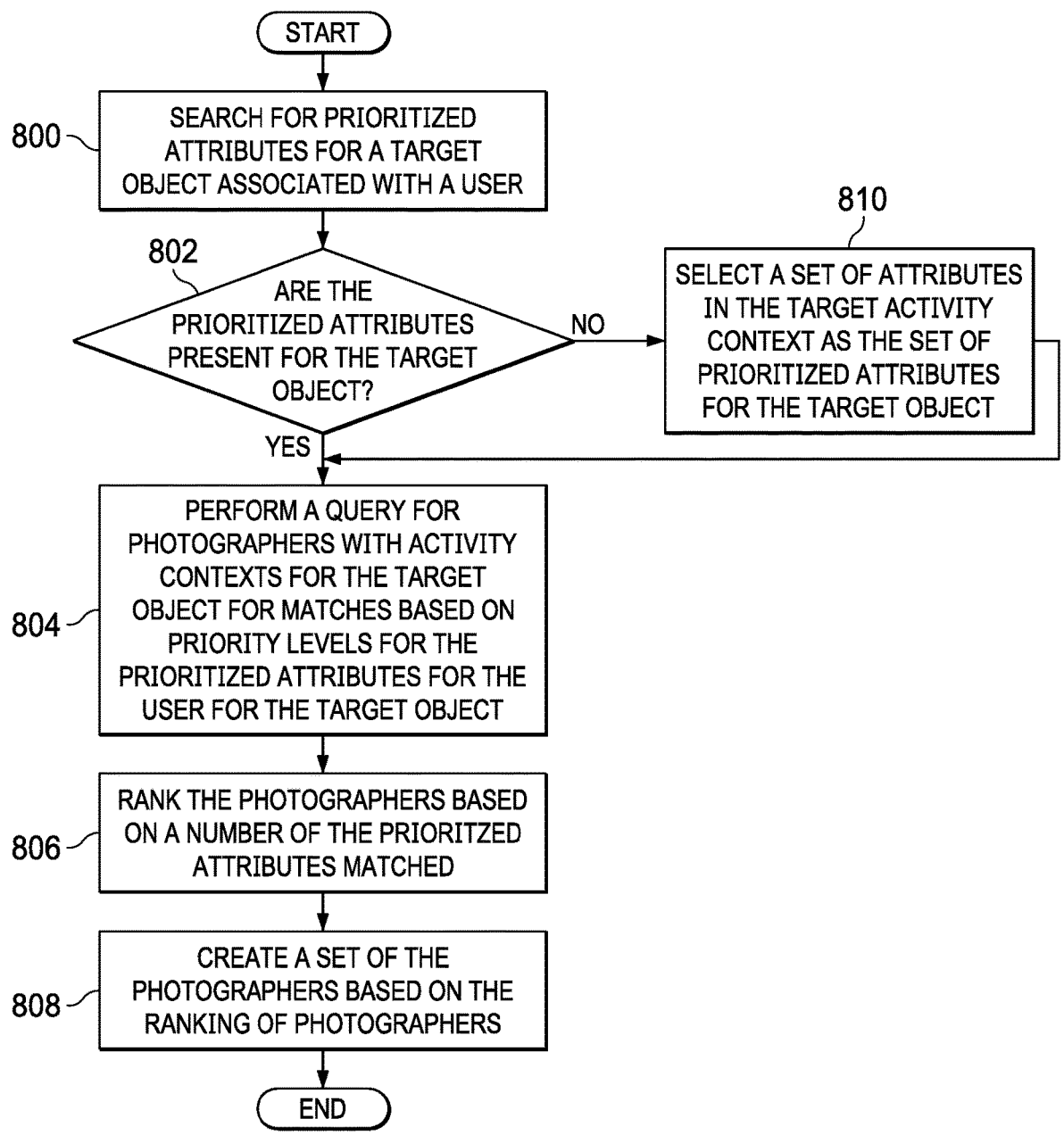
FIG. 8 is a flowchart of a process for searching for photographers in accordance with an illustrative embodiment.

With reference to FIG. 8, a flowchart of a process for searching for photographers is depicted in accordance with an illustrative embodiment. The processes in FIG. 8 can be implemented in hardware, software, or both. When implemented in software, the processes can take the form of program code that is run by one of more processor units located in one or more hardware devices in one or more computer systems. For example, these processes can be implemented in activity context processor 214 running on computer system 216 in FIG. 2.

The process begins by searching for prioritized attributes for a target object associated with a user (step 800). The process determines whether the prioritized attributes are present for the target object (step 802). If the prioritized attributes are present for the target object, the process performs a query for photographers with activity contexts for the target object for matches based on priority levels for the prioritized attributes for the user for the target object (step 804). The priority level can be configured by user preferences that indicate which priority levels are needed for considering a photographer for the target object. For example, the preferences may indicate that all of the prioritized attributes that have priority levels are needed or the prioritized attributes that have a threshold priority level are needed.

For example, the priority levels for the priority attributes may be high, medium, and low. With these levels, the user preferences may indicate that all of the priority attributes are needed to be present in the activity context for a photographer to be considered. Alternatively, the user preferences may indicate that the photographers with attributes that match the priority attributes with a high priority level are considered.

The process ranks the photographers based on the number of prioritized attributes matched (step 806). For example, all of the photographers identified all have the prioritized attributes with a high priority level. The ranking can be based on how many matches are present for the priority attributes with a medium or low priority level. The process creates a set of the photographers based on the ranking of the photographers (operation 808). The process terminates thereafter.

With reference again to step 802, if prioritized attributes are not present for the target object, the process selects a set of attributes in the target activity context as the set of prioritized attributes for the target object (step 810). The set of attributes in the target activity context can be selected using at least one of user input or a set of default selections for the target object. The set of default selections can be all of the attributes or a portion of the attributes in the target activity context. The default selections can also be attributes not in the target activity context. These attributes can be preselected based on some policy or input as to what attributes are desirable for a particular target object. The set of attributes includes target object attributes and also may include ecosystem attributes. The process then proceeds to step 804 as described above.

Figure 9A:
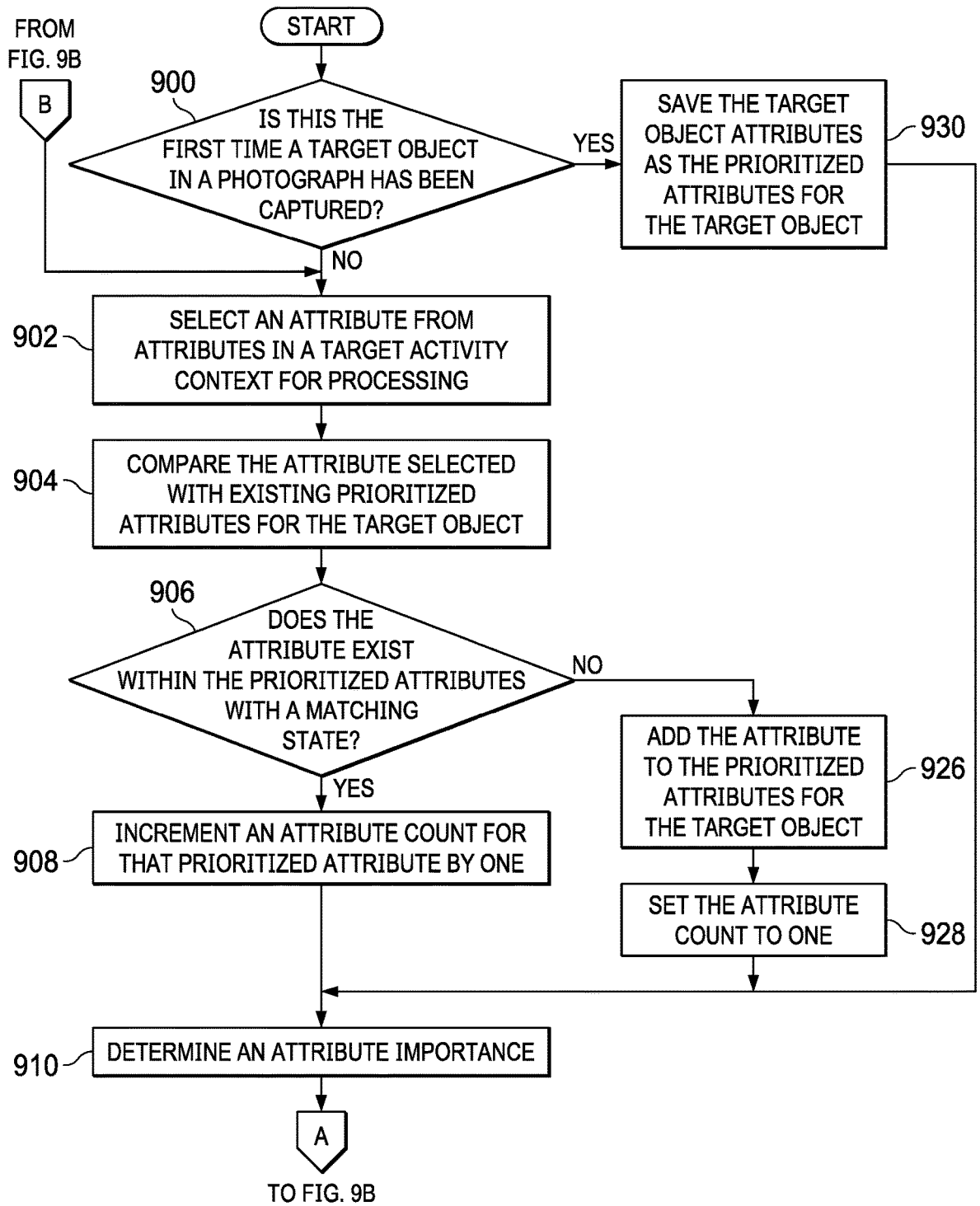
FIGS. 9A and 9B are a flowchart of a process for identifying user priorities for attributes for a target object in accordance with an illustrative embodiment.
Figure 9B:
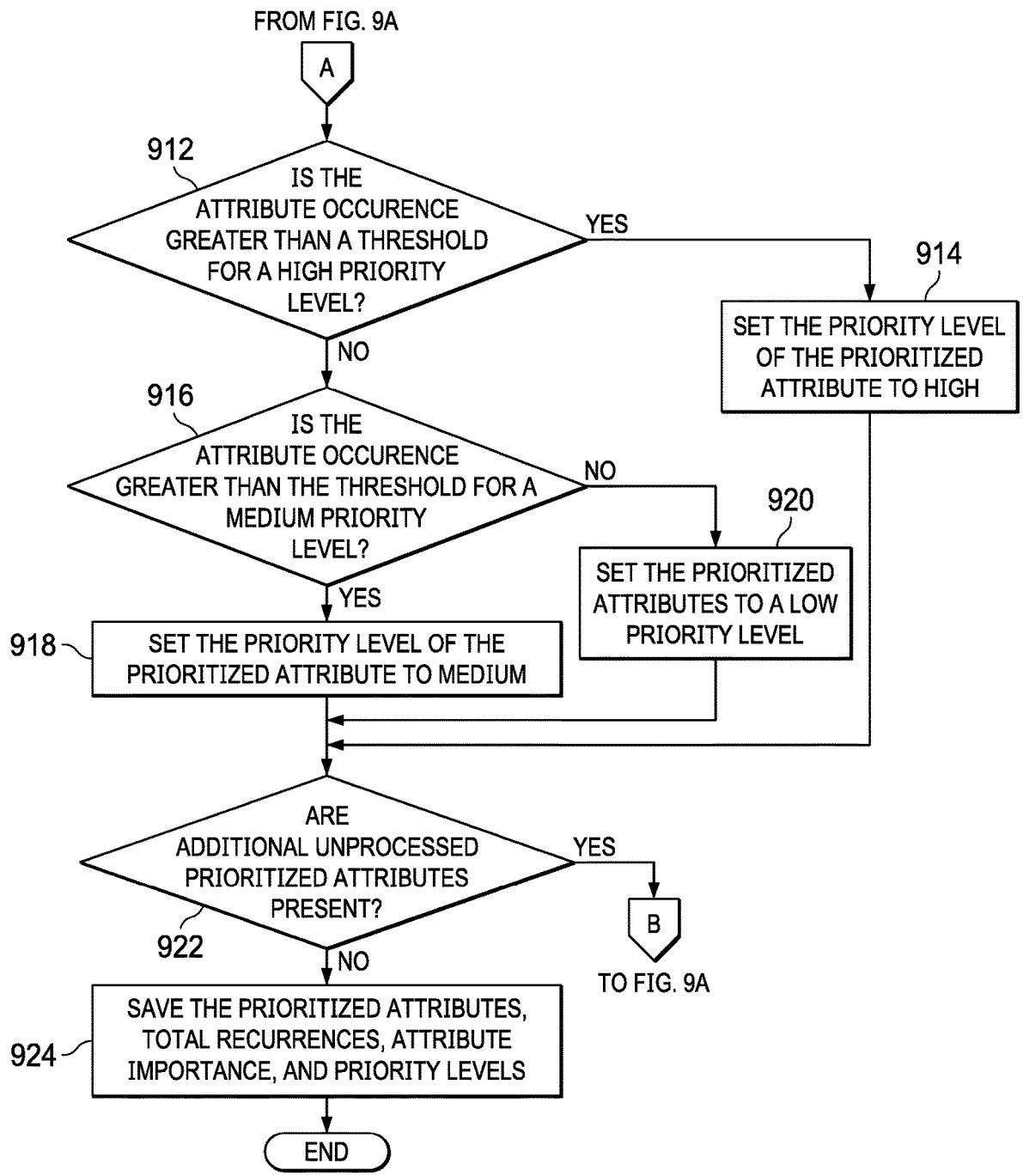

Turning now to FIGS. 9A and 9B, a flowchart of a process for identifying user priorities for attributes for a target object are depicted in accordance with an illustrative embodiment. The processes in FIGS. 9A and 9B can be implemented in hardware, software, or both. When implemented in software, the processes can take the form of program code that is run by one of more processor units located in one or more hardware devices in one or more computer systems. For example, these processes can be implemented in activity context processor 214 running on computer system 216 in FIG. 2.

This process can be initiated after a user has captured an image using an image capture device to create a photograph. In this instance, the process uses the target object activity context for the photograph as an input to update the prioritized attributes associated with the user to learn preferences of the user. These preferences can change over time, and this process can be used to update the prioritized attributes to reflect these changes. The process compares attributes in the target object activity context for the target object with prioritized attributes for the target object. This process can be used to determine prioritized attributes 242 in FIG. 2. This process can be part of a machine learning process for artificial intelligence system 234 in activity context processor 214 in FIG. 2.

The process begins by determining whether this is the first time a target object in a photograph has been captured (step 900). This determination can be made by searching to see whether attributes for the target object have been stored for a user. In this illustrative example, the attributes include target object attributes and also can include ecosystem attributes about an ecosystem in the photograph of the target object.

If this is not the first time the target object has been captured in a photograph, the process selects an attribute from attributes in a target activity context for processing (step 902). The process compares the attribute selected with existing prioritized attributes for the target object (step 904).

A determination is made as to whether the attribute exists within the prioritized attributes with a matching state (step 906). For example, if the target object attribute is a beak for a bird and the state is closed, the process determines whether the same attribute is present in the prioritized attributes and, if the same attribute is present, whether the same state is present.

If the target object attribute is present in the prioritized attributes with the matching state, the process increments the attribute count for that prioritized attribute by 1 (step 908). The process then determines an attribute importance (step 910). In step 906, the attribute importance can be determined as follows:

$$I = \text{total occurrences/total target photographs}$$

where I is the attribute importance, total occurrences is a total number of times the prioritized attribute has been identified in photographs, and total target photographs is a total number of photographs in which the target object is present.

The process then determines whether the attribute occurrence is greater than a threshold for a high priority level (step 912). If the attribute occurrence is greater than the threshold for the high priority level, the process then sets the priority level of the prioritized attribute to high (914). With reference again to step 912, if the attribute occurrence is not greater than the threshold for the high priority level, a determination is made as to whether the attribute occurrence is greater than the threshold for a medium priority level (step 916). If the attribute occurrence is greater than the threshold for the medium priority level, the process sets the priority level of the prioritized attribute to medium (step 918). Otherwise, the process sets the prioritized attributes to a low priority level (step 920).

From both step 914, step 918, and step 920, the process determines whether additional unprocessed prioritized attributes are present (step 922). If the additional unprocessed prioritized attributes are present, the process returns to step 902. Otherwise, the process saves the prioritized attributes, total recurrences, attribute importance, and priority levels (step 924) with the process terminating thereafter. In this example, information in step 916 can be stored in a table, a database, or other type of data structure.

With reference back to step 906, if the attribute does not exist within the prioritized attributes with a matching state, the process adds the attribute to the prioritized attributes for the target object (step 926). The process sets the attribute count to one (step 928). The process the proceeds to step 910 as described above.

With reference again to step 900, if this is the first time the target object is capture in a photograph, the target object attributes are saved as the prioritized attributes for the target object (step 930). The process then proceeds to step 910. In this example, step 930 saves the target object attributes and their states. The target object attributes that are saved can be based on user preferences or user input selecting which target object attributes should be saved. The attribute occurrence is set to one for the target object attributes.

In FIGS. 9A and 9B, attributes have a priority level. A user may choose to suppress all or some of the attributes processed. Further, the user may decide to use one or more of the priority levels instead of all of the priority levels. For example, the user may choose to only use high or medium priority levels in searching activity contexts for photographers.

Further, the user can choose to change the priority level for a prioritized attribute. For example, the user can change a prioritized attribute with a high priority level to a medium priority level. The user could also change a prioritized attribute with a low priority level to a medium priority level or a high priority level. With these changes, the user can change the results of a search for a photographer.

Figure 10:
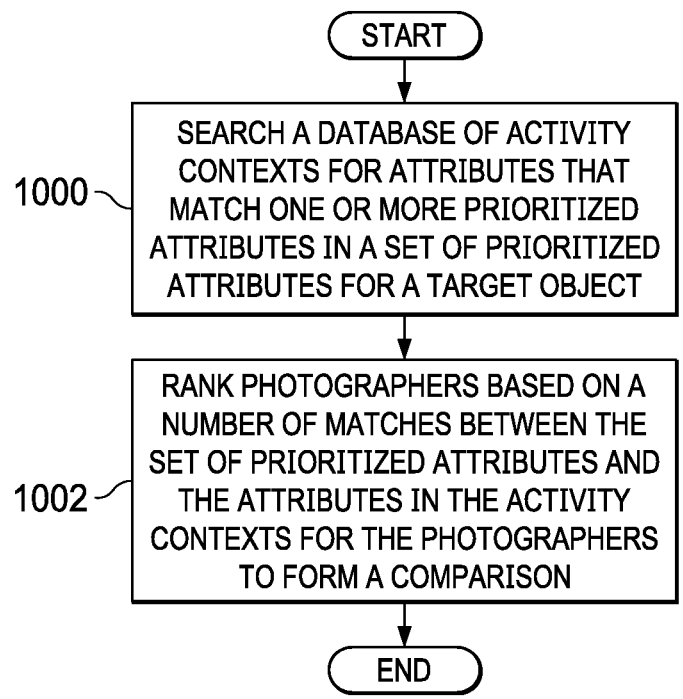
FIG. 10 is a flowchart of process for comparing prioritized attributes to attributes in activity contexts in accordance with an illustrative embodiment.

With reference next to FIG. 10, a flowchart of a process for comparing prioritized attributes to attributes in activity contexts is depicted in accordance with an illustrative embodiment. The processes in FIG. 10 can be implemented in hardware, software, or both. When implemented in software, the processes can take the form of program code that is run by one of more processor units located in one or more hardware devices in one or more computer systems. For example, these processes can be implemented in activity context processor 214 running on computer system 216 in FIG. 2. This process can be used to compare a set of prioritized attributes 242 with attributes 252 for target activity context 224 for target object 218 to form comparison 254 in FIG. 2.

The process begins by searching a database of activity contexts for attributes that match one or more prioritized attributes in a set of prioritized attributes for the target object (step 1000). The process ranks photographers based on a number of matches between the set of prioritized attributes and the attributes in the activity contexts for the photographers to form a comparison (step 1002). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the flowchart in FIGS. 9A and 9B shows priority levels of high, medium, and low. Other types of categorizations can be used. For example, the priority levels could be integers from one to five.

In FIG. 11, a table of prioritized attributes for a target object is depicted in accordance with an illustrative embodiment. In this illustrative example, table 1100 is an example of a data structure in which prioritized attributes processed in FIG. 8 and in FIGS. 9A and 9B can be stored.

Table 1100 can be located in a database such as photographer database 250 in FIG. 2. In this illustrative example, table 1100 can be used to store prioritized attributes, such as prioritized attributes 242 in FIG. 2, for a target object.

As depicted, table 1100 has columns for prioritized attribute 1102, state 1104, attribute occurrence 1106, total photographs 1108, attribute importance 1110, and priority level 1112. As depicted, table 1100 includes two entries: entry 1114 and entry 1116.

The types of prioritized attributes that can be included in table 1100 include target attributes for a target object. The prioritized attributes in table 1100 can also include ecosystem attributes and photographer attributes. In comparing the prioritized attributes from the target activity context with attributes in an activity context for different photographers, prioritized attributes for the target are present in the illustrative examples.

For example, if the target object is a bird, the prioritized attributes can be an open beak. Additionally, the prioritized attributes may also include ecosystem attributes such as a presence of water. These prioritized attributes can be stored in table 1100.

With reference to entry 1114, prioritized attribute 1102 is an ecosystem attribute for water. State 1104 of the water is present. Attribute occurrence 1106 is 5, which represents a number of times water has been present in photographs. Total photographs 1108 is 5 which is the total number of photographs processed. Attribute importance 1110 is 1 in this example. Attribute importance is the number of times the attribute is present divided by the number of photographs. Priority level 1112 is high. The level can be determined by comparing the attribute occurrence to a threshold. Priority level 1112 is an indication of the prioritization and can be used in identifying photographers and ranking the photographers as described in the flowchart in FIG. 8.

As depicted, entry 1116 has prioritized attribute 1102 that is a beak, which is a target attribute. State 1104 for the beak is open. Attribute occurrence 1106 is 3, which represents a number of times an open beak has been present in the photographs. Total photographs 1108 is 5 which is the total number of photographs processed. Attribute importance 1110 is 0.6 and priority level 1112 is medium for entry 1116.

The illustration of table 1100 is not meant to limit the manner in which prioritized attributes and other information for privatized attributes can be stored. In other examples, information can be stored in a flat file, a linked list, or in some of type of data structure. Additionally, in other illustrative examples, a table for prioritized attributes may include additional columns or may omit columns from those depicted in table 1100. For example, attribute importance 1110 may be omitted in some examples.

Figure 12:
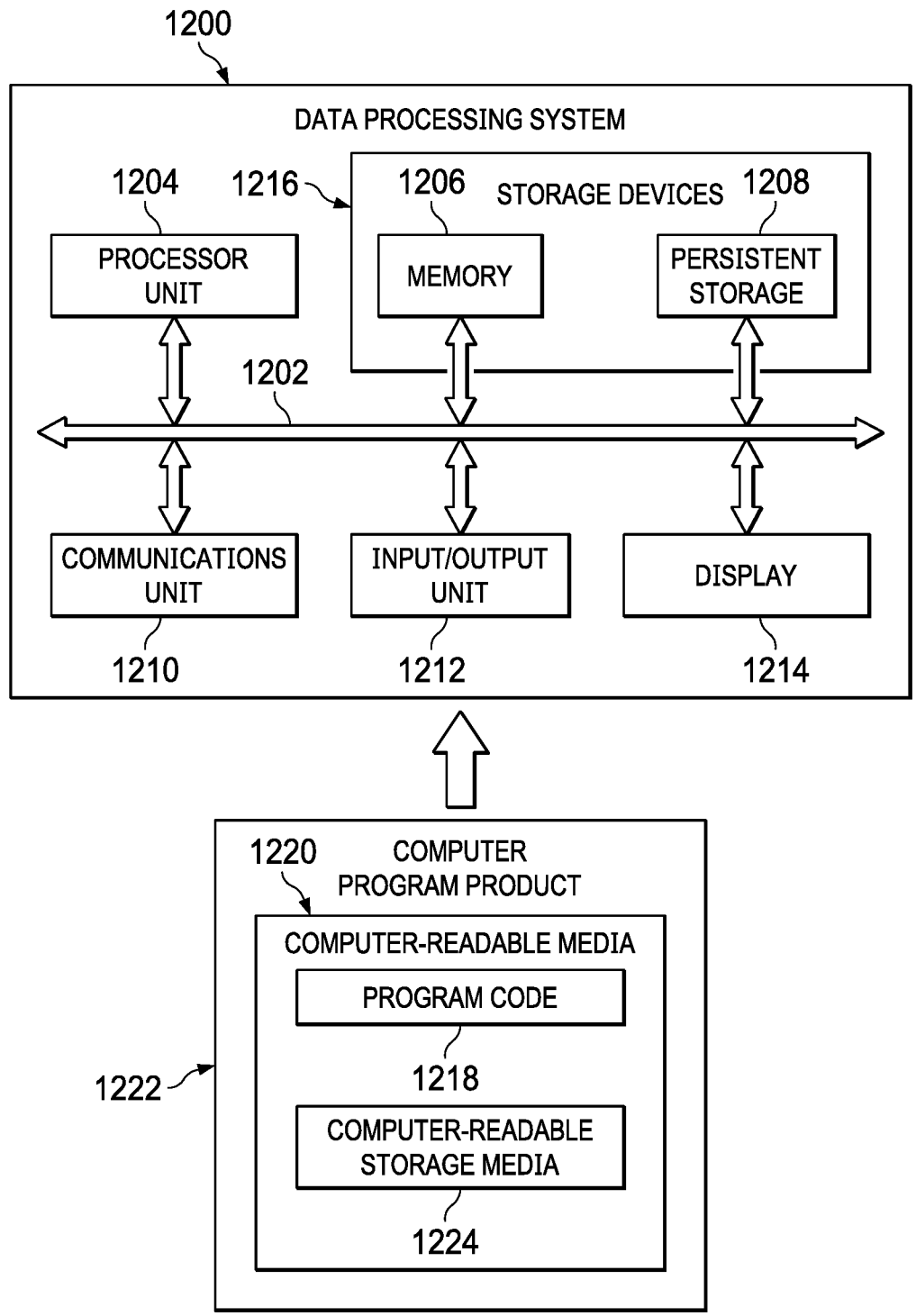
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement computer system 216 and an image capture device 204 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid-state drive (SSD), a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and processed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for processing by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over connections, such as wireless connections, optical fiber cable, coaxial cable, a wire, or any other suitable type of connection.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, the illustrative embodiments provide a method, apparatus, system, and computer program product for capturing images with an image capture device. A target activity context for a target object in an image from an image capture device is received by a computer system. A set of photographers for the target object using the target activity context is identified. The set of photographers identified is sent to the image capture device. Responsive to receiving a selection of a photographer from the set of photographers from the image capture device, an inbound activity context for the photographer for the target object is sent to the image capture device, wherein the image capture device is configured to capture the image of the target object using the inbound activity context.

In the examples, once a user selects a favorite or preferred expert photographer for a target object, the expert photographer's preferences and settings for capturing an image of the target object are downloaded in an incoming activity context into the user's image capture device. The inbound activity context is compared continuously with current target activity context for the user for a match and confidence level. Once a match is found, at least one of notifying the user via a visual indicator or an audio indicator or capturing the image occurs. When the image is captured, the target activity context for the captured image can be used to update existing prioritized attributes and prioritized levels for the user as part of learning the changed behavior of the user for future use in identifying photographers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for configuring an image capture device:
   receiving, by a computer system, a target activity context for a target object in an image from an image capture device;
   identifying, by the computer system, a set of photographers for the target object using target activity context;
   sending, by the computer system, the set of photographers identified to the image capture device; and
   responsive to receiving a selection of a photographer from the set of photographers from the image capture device, sending, by the computer system, an inbound activity context for the photographer for the target object to the image capture device, wherein the image capture device is configured to capture the image of the target object using the inbound activity context.

2. The method of claim 1, wherein identifying, by the computer system, the set of photographers for the target object using target activity context comprises:
   identifying, by the computer system, the set of photographers for the target object using target activity context and set of activity contexts associated with the set of photographers.

3. The method of claim 1, wherein identifying, by the computer system, the set of photographers for the target object using target activity context comprises:
   identifying, by the computer system, the set of photographers for the target object using target activity context and a set of prioritized attributes for the target object associated with a user of the image capture device.

4. The method of claim 3, wherein identifying, by the computer system, the set of photographers for the target object using target activity context and the set of prioritized attributes for the target object associated with a user of the image capture device comprises:
   identifying, by an artificial intelligence system running on the computer system, the set of photographers for the target object using target activity context and the set of prioritized attributes for the target object associated with a user of the image capture device.

5. The method of claim 1 further comprising
   sending, by the image capture device, the target activity context for the target object in an image to the computer system;
   receiving, by the image capture device, a user input with the selection of the photographer from set of photographers for the target object received from the computer system;
   responsive to sending the selection of the photographer, receiving, image capture device, the inbound activity context for the photographer;
   comparing; by the image capture device, the inbound activity context with a current target activity context for the target object in the image to form a comparison; and
   capturing, by the image capture device, the image based on the comparison.

6. The method of claim 1, wherein the inbound activity context for photographer for the target object includes photographic settings for the image capture device.

7. The method of claim 1, wherein the target activity context comprises a set of target object attributes associated with the target object in the image.

8. The method of claim 7, wherein target activity context further comprises a set of ecosystem attributes for an ecosystem in the image.

9. The method of claim 8, wherein the set of target object attributes is selected from at least one of a target object type, a category of the target object, a focus point of interest in the target object, a size of the target object, a distance between the target object and an image capture device, an angle between the target object and the image capture device, a view type of the target object, a shadow indicator and wherein the set of ecosystem attributes for the ecosystem is selected from at least one of a time, a light level, a location, or ecosystem object type.

10. An image capture system comprising:
    an image capture device; and
    a computer system comprising a processor and a memory operatively coupled to the processor, wherein the memory comprises instructions executable by the processor to perform steps of:
       receiving, by the computer system, a target activity context for a target object in an image from the image capture device;
       identifying, by the computer system, a set of photographers for the target object using target activity context;
       sending, by the computer system, the set of photographers identified to the image capture device; and
       responsive to receiving a selection of a photographer from the set of photographers from the image capture device, sending, by the computer system, an inbound activity context for the photographer for the target object to the image capture device, wherein the image capture device is configured to capture the image of the target object using the inbound activity context.

11. The image capture system of claim 10, wherein identifying the set of photographers for the target object using target activity context comprises identifying the set of photographers for the target object using target activity context and set of activity contexts associated with the set of photographers.

12. The image capture system of claim 10, wherein identifying the set of photographers for the target object using target activity context comprises identifying the set of photographers for the target object using target activity context and a set of prioritized attributes for the target object associated with a user of the image capture device.

13. The image capture system of claim 12, wherein identifying the set of photographers for the target object using target activity context and the set of prioritized attributes for the target object associated with a user of the image capture device comprises identifying the set of photographers for the target object using target activity context and the set of prioritized attributes for the target object associated with a user of the image capture device using an artificial intelligence system running on the computer system.

14. The image capture system of claim 12 wherein the image capture device is configured to send the target activity context for the target object in an image to the computer system; receiving user input with the selection of the photographer from set of photographers for the target object received from the computer system; receive the inbound activity context for the photographer in response to sending the selection of the photographer; compare the inbound activity context with a current target activity context for the target object in the image to form a comparison; and capture the image based on the comparison.

15. The image capture system of claim 10, wherein the inbound activity context for photographer for the target object includes photographic settings for the image capture device.

16. The image capture system of claim 10, wherein the target activity context comprises a set of target attributes associated with the target object in the image and a set of ecosystem attributes for a set of ecosystem objects in the image.

17. A computer program product for configuring an image capture device, the computer program product comprising:
 a computer-readable storage medium;
 first program code, stored on the computer-readable storage medium, for receiving a target activity context for a target object in an image from an image capture device;
 second program code, stored on the computer-readable storage medium, for identifying a set of photographers for the target object using target activity context;
 third program code, stored on the computer-readable storage medium, for sending the set of photographers identified to the image capture device; and
 fourth program code, stored on the computer-readable storage medium, for sending an inbound activity context for a photographer in the set of photographers for the target object to the image capture device in response to receiving a selection of a photographer from the set of photographers from the image capture device, wherein the image capture device is configured to capture the image of the target object using the inbound activity context.

18. The computer program product of claim 17, wherein the second program code comprises: program code, stored on the computer-readable storage medium, for identifying the set of photographers for the target object using target activity context and a set of prioritized attributes for the target object associated with a user of the image capture device.

19. The computer program product of claim 18, wherein the program code comprises: program code, stored on the computer-readable storage medium, for identifying the set of photographers for the target object using target activity context and the set of prioritized attributes for the target object associated with a user of the image capture device using an artificial intelligence system.

20. The computer program product of claim 18, wherein the target activity context comprises a set of target attributes associated with the target object in the image and a set of ecosystem attributes for a set of ecosystem objects in the image.

* * * * *